W. H. HERMSDORF.
MACHINE FOR MAKING COATED ARTICLES.
APPLICATION FILED OCT. 5, 1914.
1,301,559.
Patented Apr. 22, 1919.
12 SHEETS—SHEET 1.
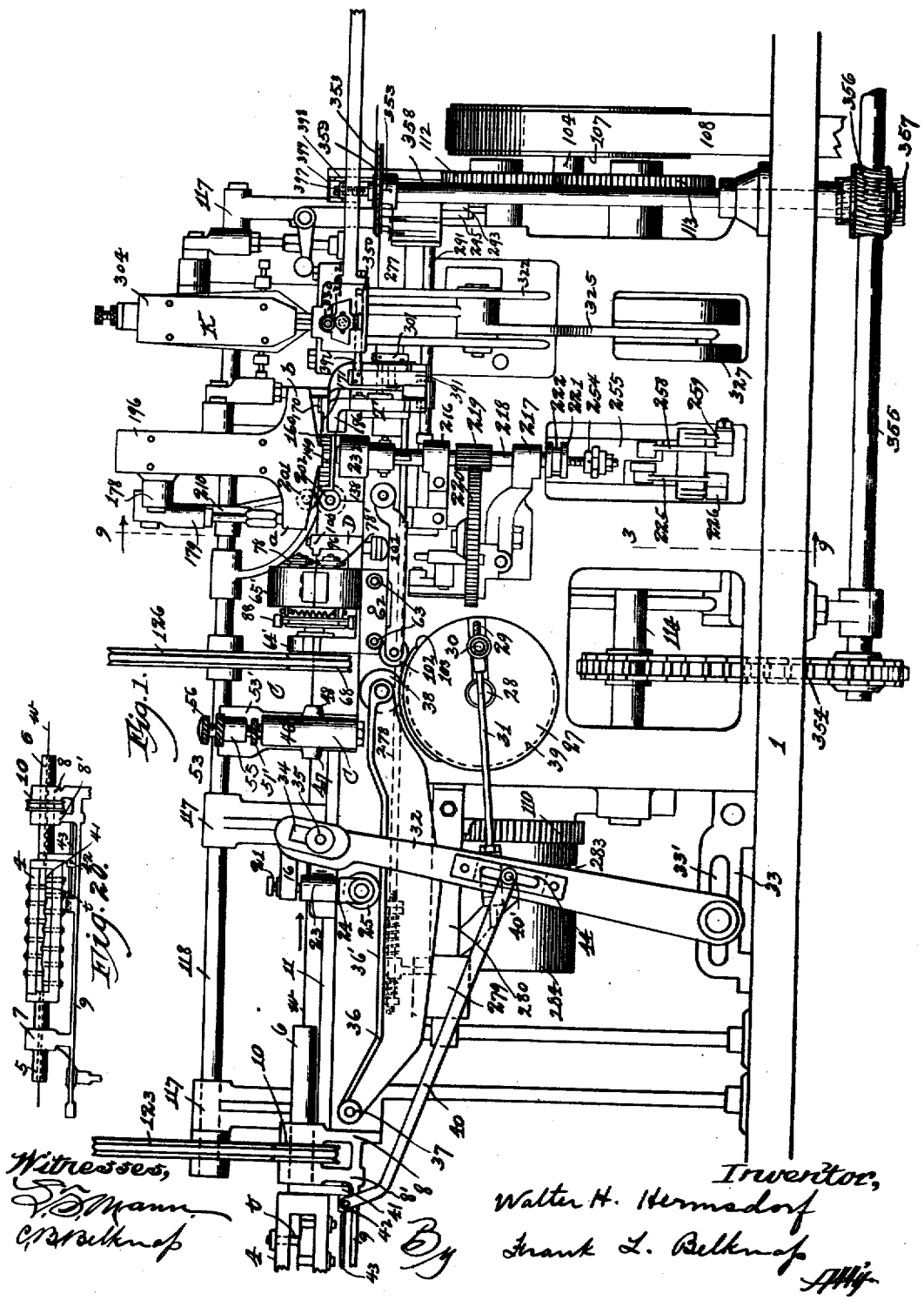

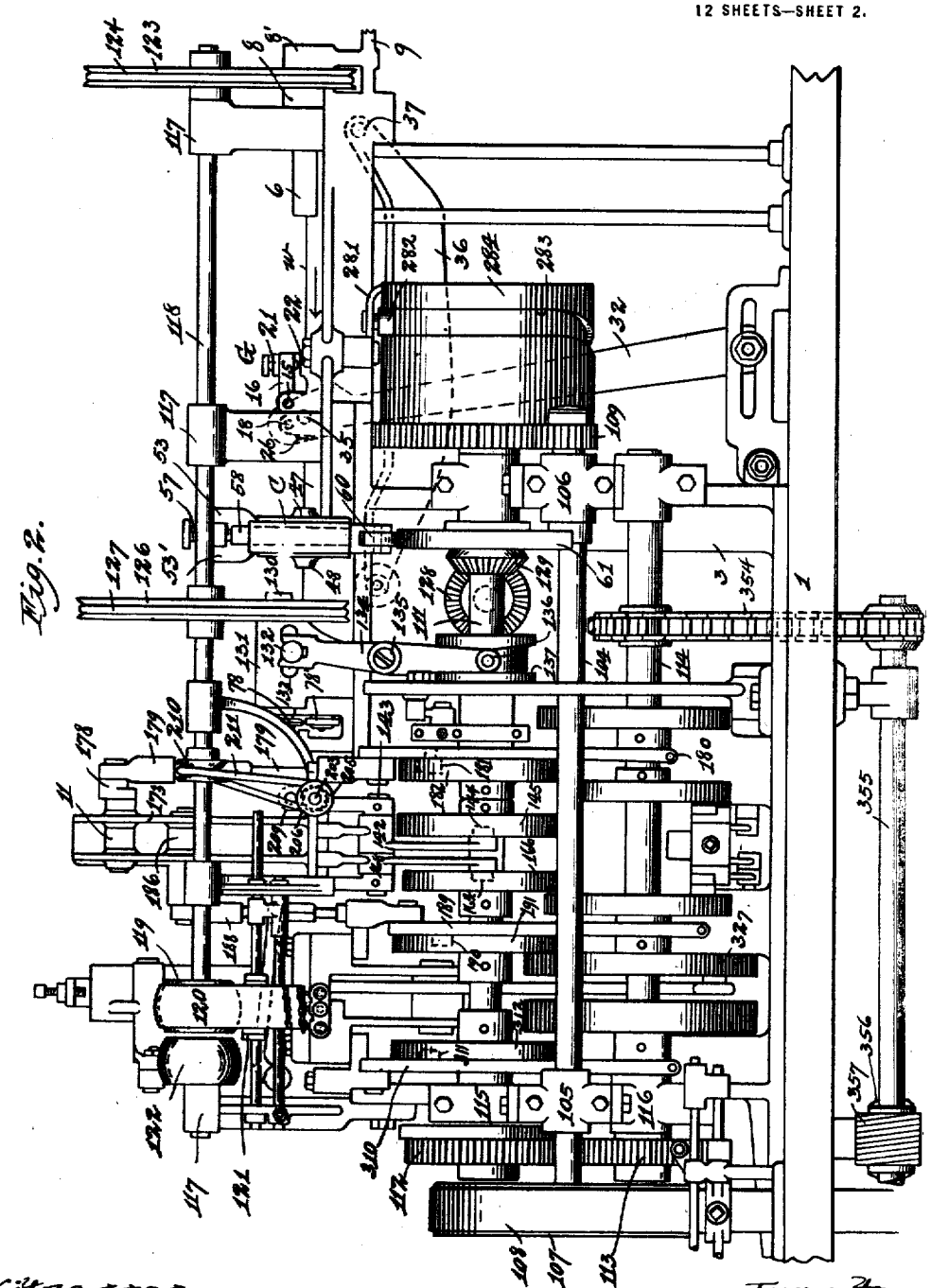

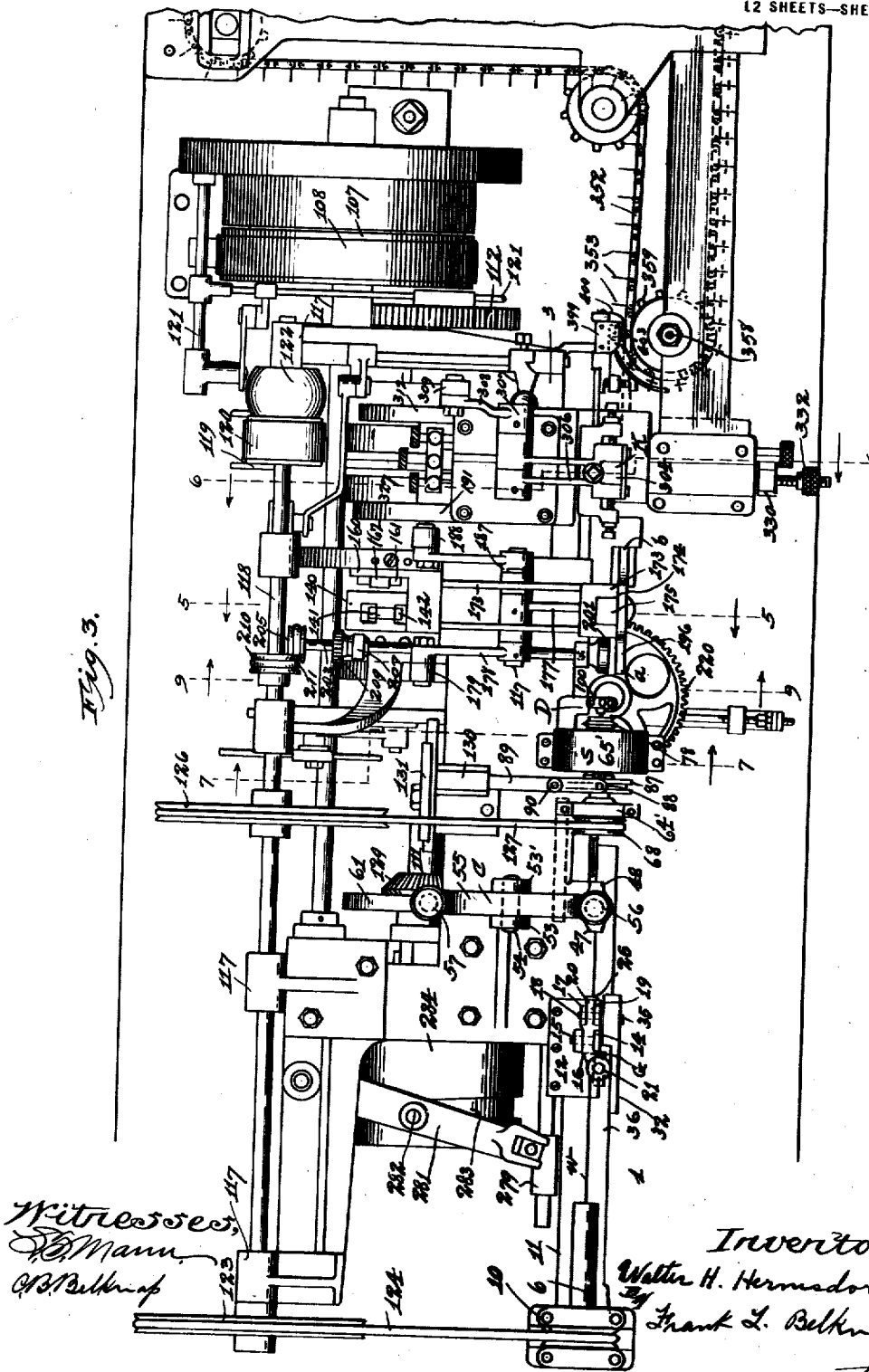

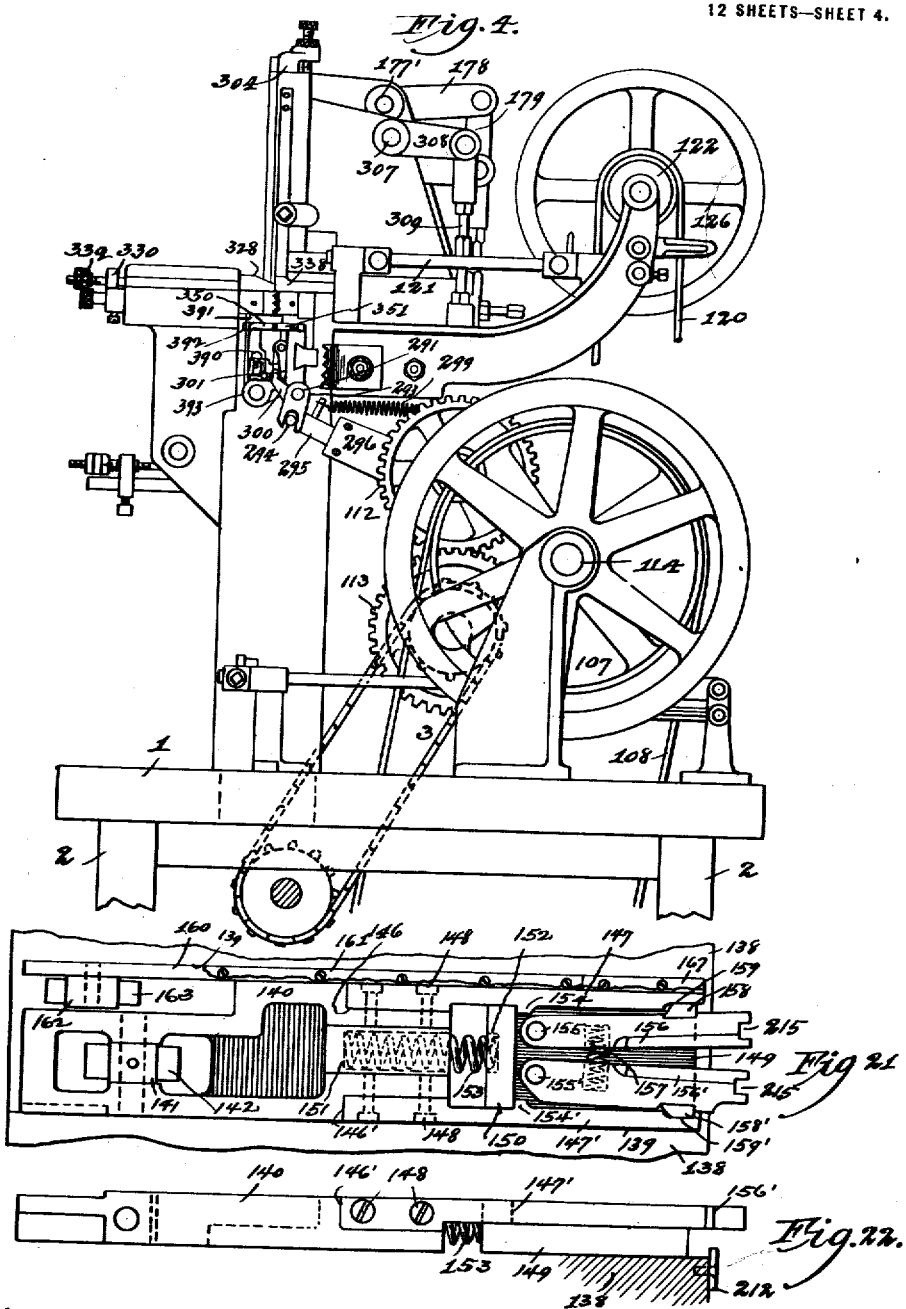

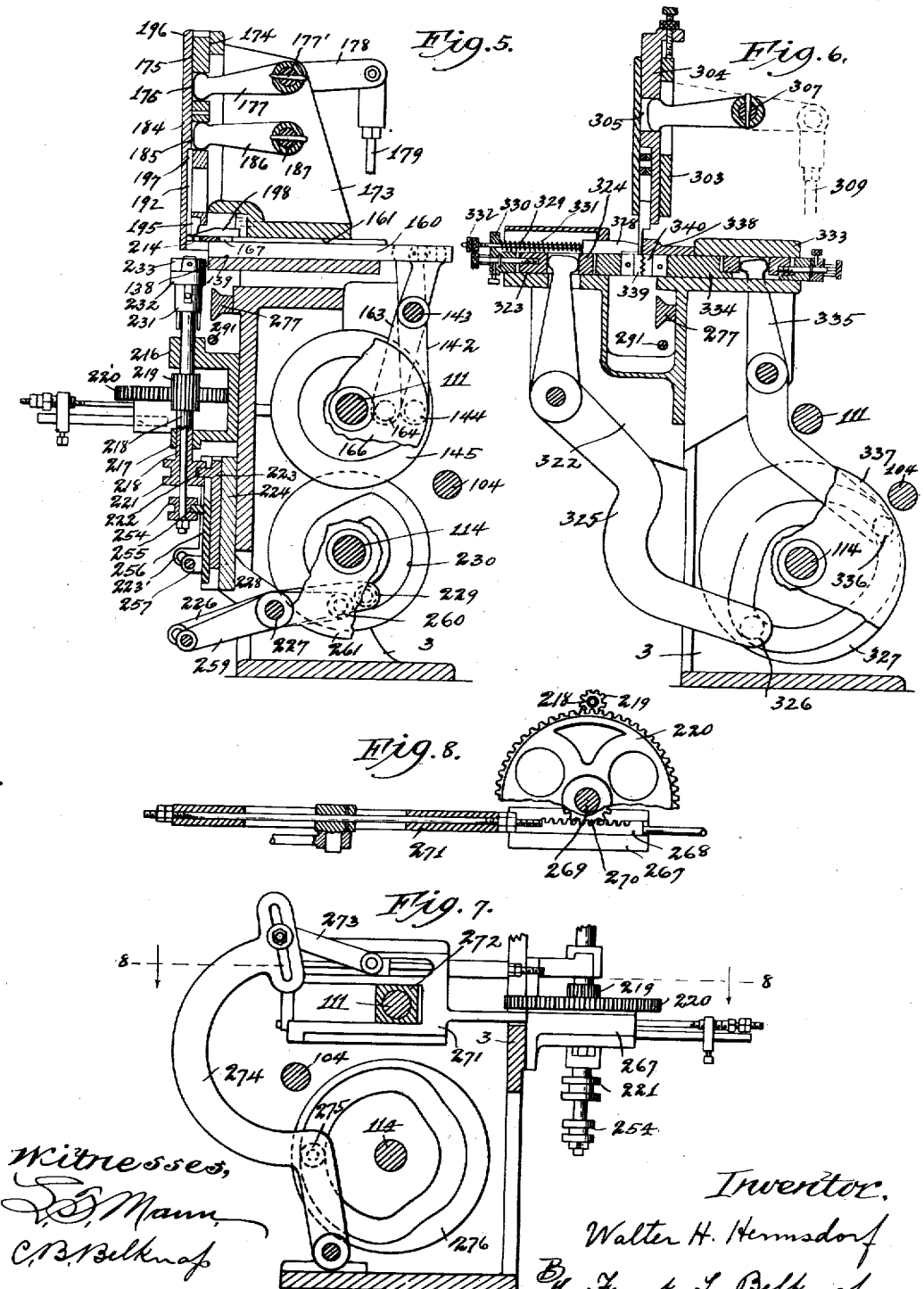

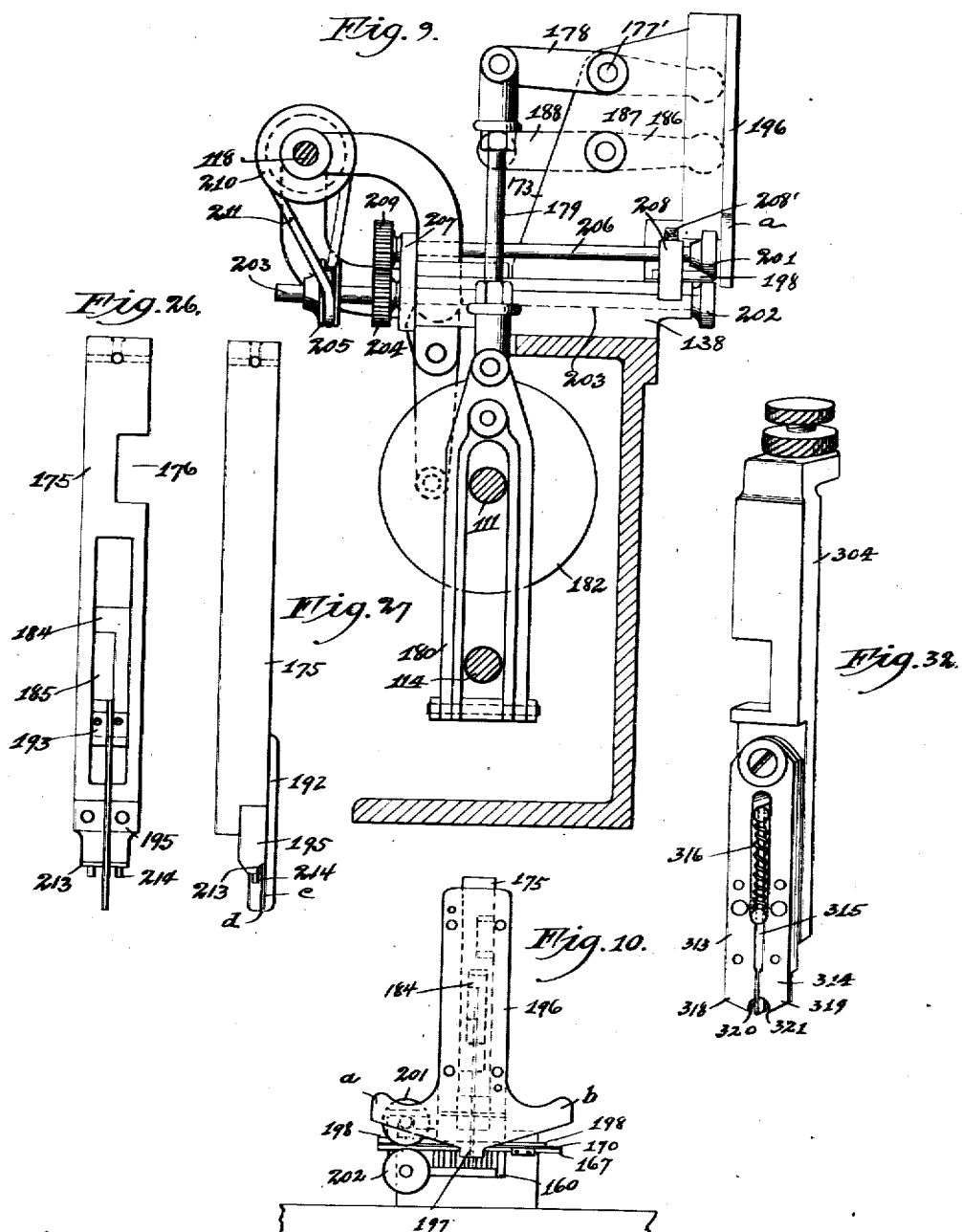

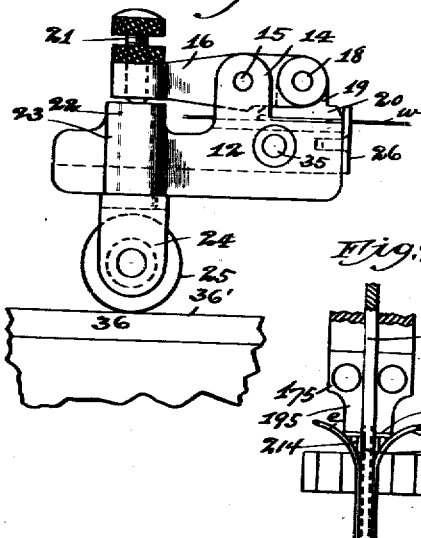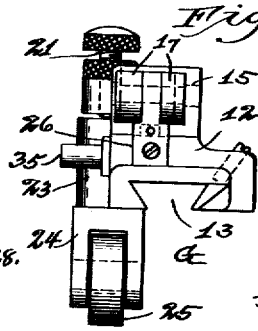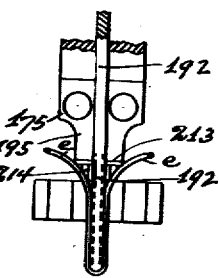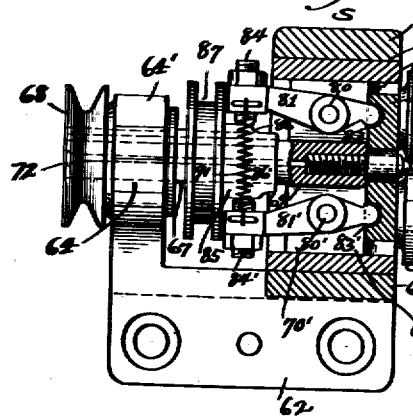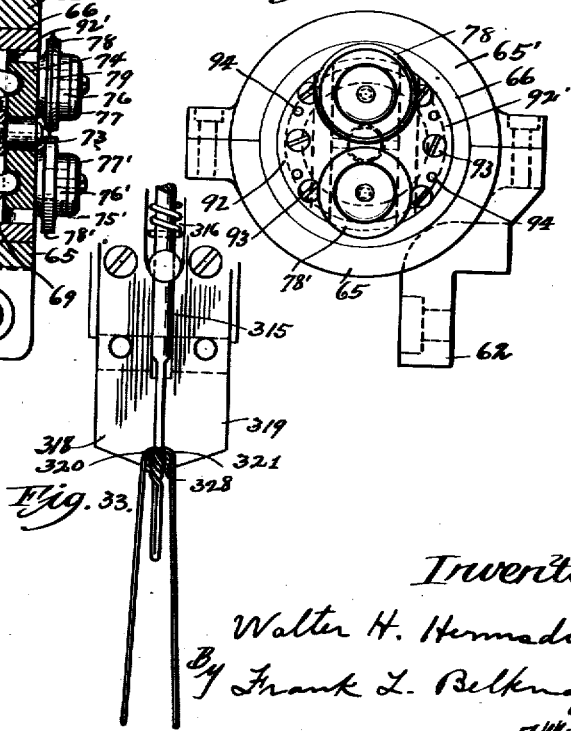

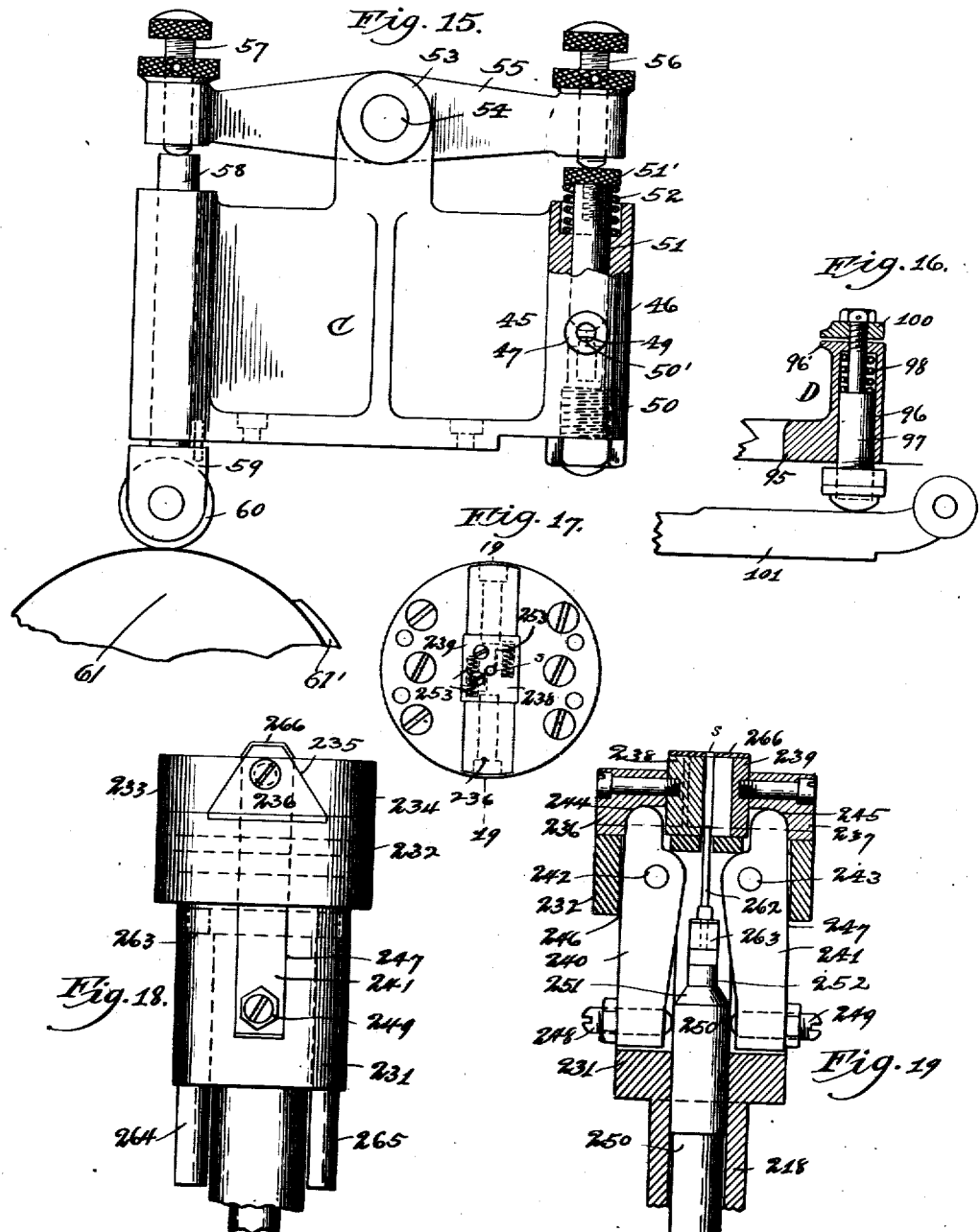

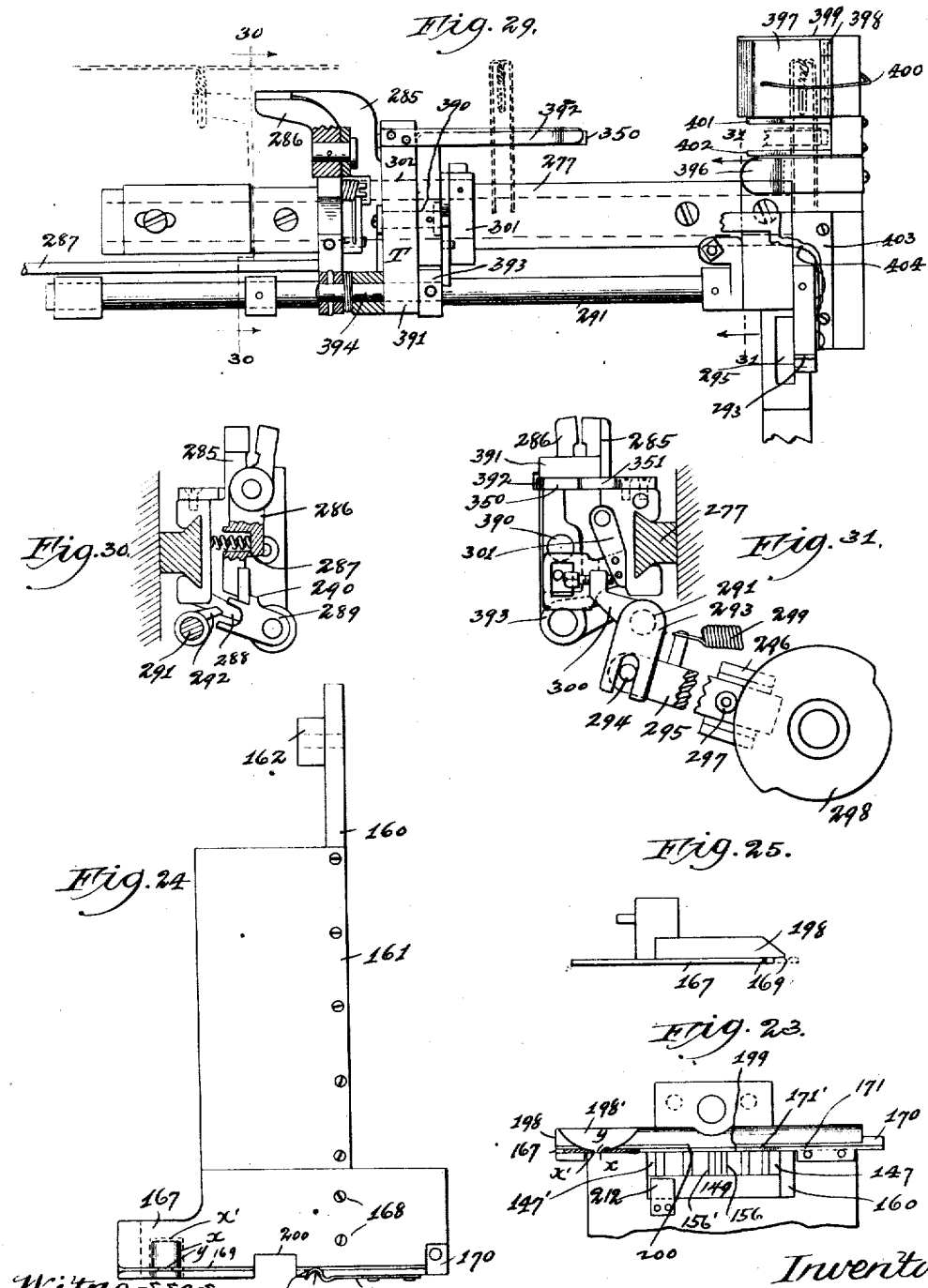

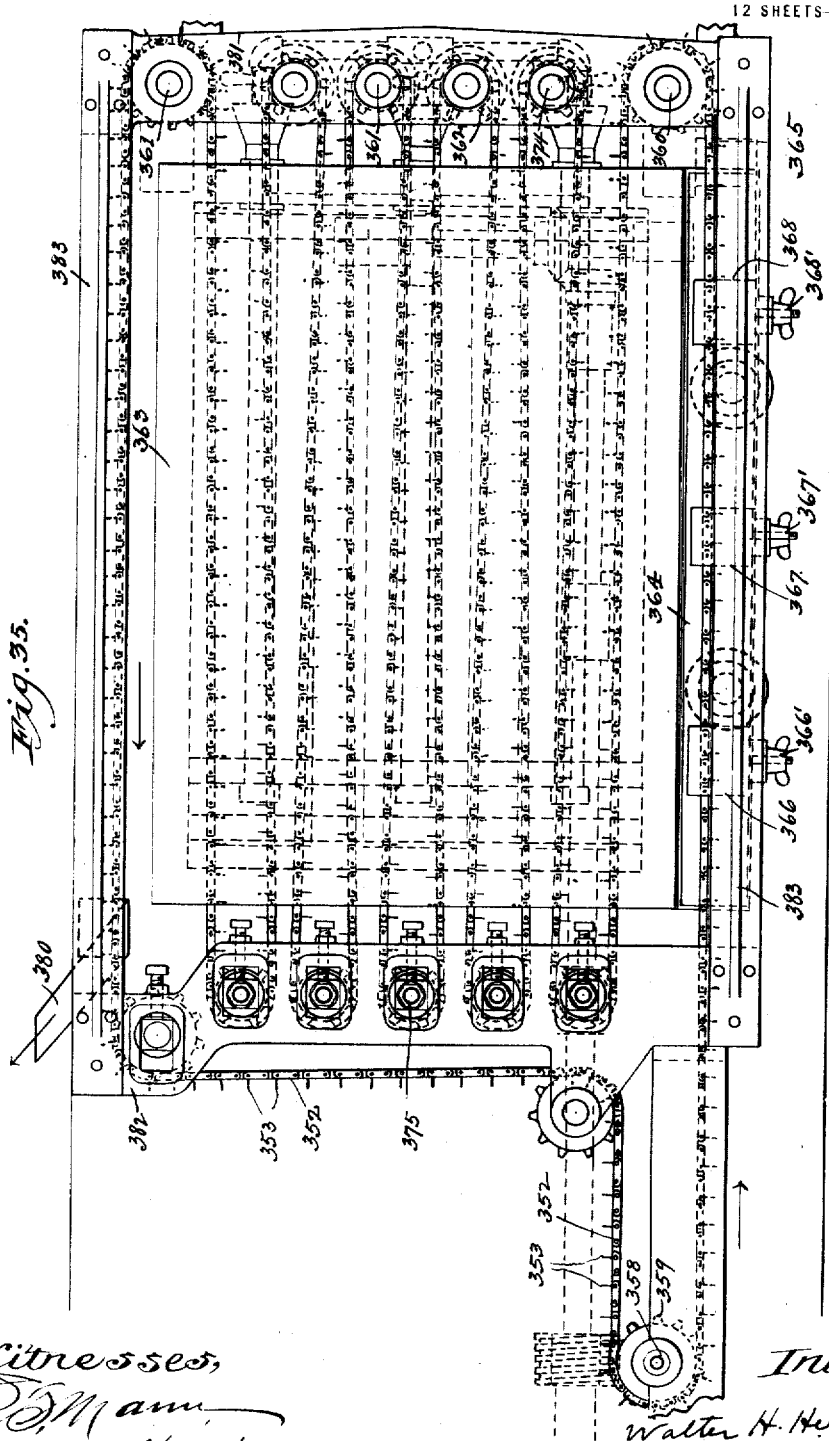

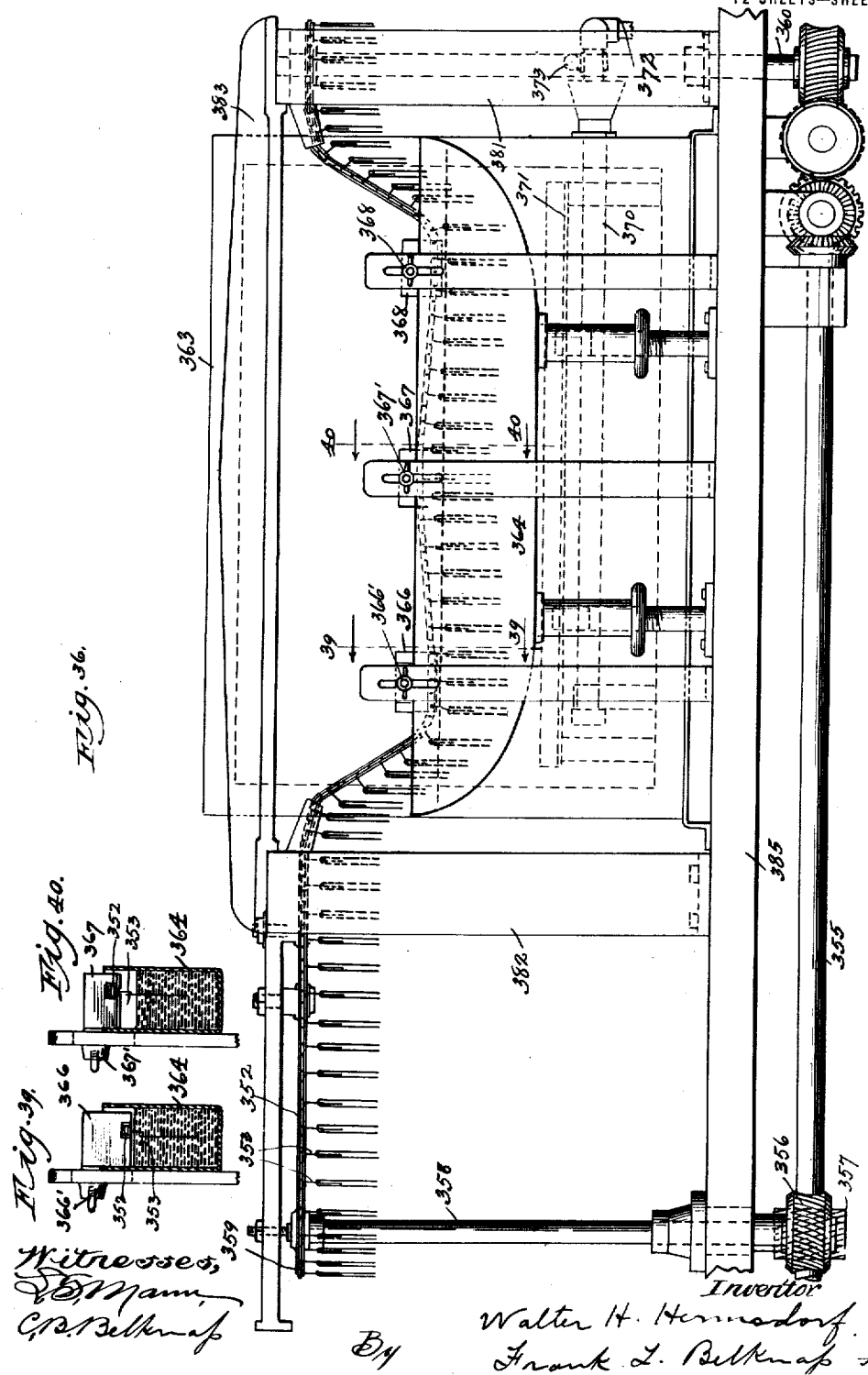

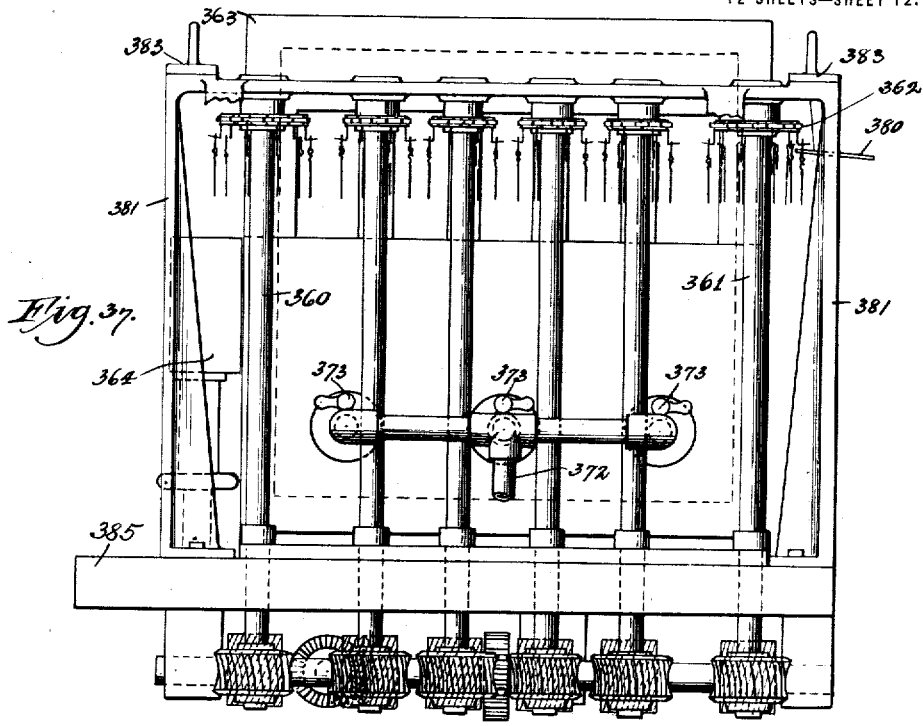
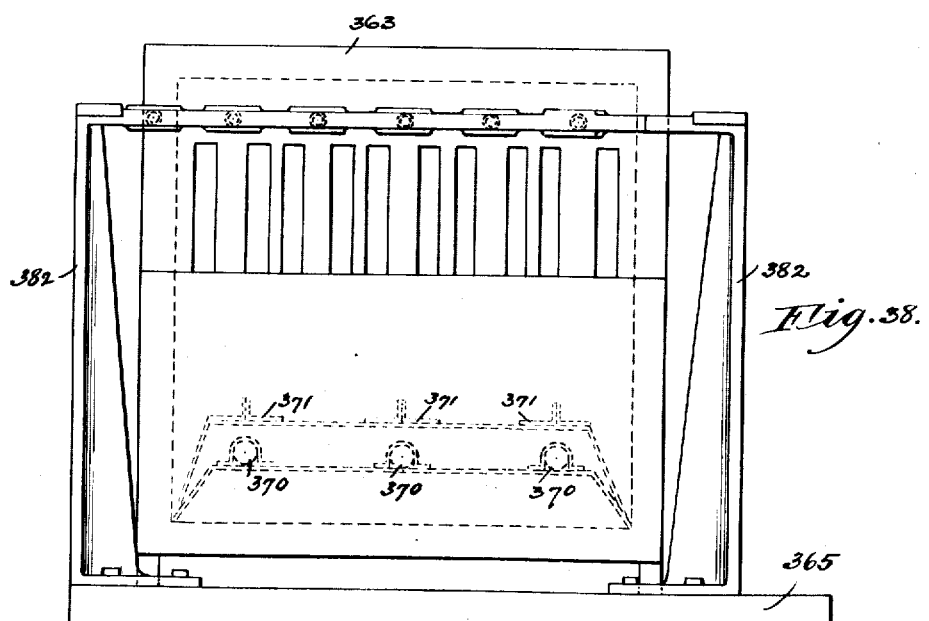

UNITED STATES PATENT OFFICE.

WALTER H. HERMSDORF, OF CHICAGO, ILLINOIS, ASSIGNOR, BY MESNE ASSIGNMENTS, TO THE HUMP HAIRPIN MANUFACTURING COMPANY, OF CHICAGO, ILLINOIS, A CORPORATION OF WEST VIRGINIA.

MACHINE FOR MAKING COATED ARTICLES.

1,301,559. Specification of Letters Patent. Patented Apr. 22, 1919.

Application filed October 5, 1914. Serial No. 865,201.

*To all whom it may concern:*

Be it known that I, WALTER H. HERMSDORF, a citizen of the United States, and a resident of Chicago, Cook county, and State of Illinois, have invented certain new and useful Improvements in Machines for Making Coated Articles, of which the following is a specification.

My invention relates to a machine for making coated articles, and more particularly to a machine adapted to produce a plurality of complete hairpins or the like from a wire roll.

The salient objects of the invention are to provide a machine of the character above referred to, in which the japanning or other coating operation can be accomplished synchronously with the shaping of the article and as a step in a continuous process; to provide a machine in which the formed articles are automatically carried into position to be coated; to utilize the same carrying mechanism by which the articles are moved into coating position, for conducting the coated articles through the drying operation; to permit of an extra amount of the coating material being applied to a certain portion or portions of each article without any material increase of equipment or number of operations; to provide an improved machine for coating or japanning hairpins or similar articles; and in general to provide a machine of the character first abovementioned by which raw material can be rapidly and economically turned into a large output of finished articles of uniformly high quality, the entire process being carried out by automatic machinery.

In the drawings—

Figure 1 is a front elevational view,

Fig. 2 is a rear elevational view,

Fig. 3 is a plan view,

Fig. 4 is an elevational view of the right end of the machine,

Fig. 5 is a transverse sectional view taken on plane 5—5, Fig. 3,

Fig. 6 is a sectional view on plane 6—6, Fig. 3,

Fig. 7 is a transverse sectional view taken on plane 7—7, Fig. 3,

Fig. 8 is an enlarged horizontal sectional view taken on plane 8—8, Fig. 7,

Fig. 9 is a sectional view on plane 9—9, Fig. 8,

Fig. 10 is an enlarged front elevational view of wire looping mechanism,

Fig. 11 is an enlarged elevational view of the wire feeding gripper,

Fig. 12 is a side elevational view of such gripper,

Fig. 13 is an enlarged front sectional view of wire cutting mechanism,

Fig. 14 is an end elevational view of such cutting mechanism,

Fig. 15 is an enlarged side elevational view of wire clamping structure,

Fig. 16 is an enlarged front elevational view partly in section, of auxiliary wire clamping mechanism and the controlling cam therefor, Fig. 17 is a view of the top of the wire twister, Fig. 18 is a side elevational view of the twister head, Fig. 19 is a sectional view of the head on plane 19—19, Fig. 17, Fig. 20 is a reduced front elevational view of the wire straightener mechanism, Fig. 21 is an enlarged plan view of the slidable anvil structure for the looping mechanism, Fig. 22 is a side view of the anvil structure, Fig. 23 is an enlarged front view of the anvil structure and mechanism for guiding the wire thereover, Fig. 24 is a plan view of the wire guiding mechanism, Fig. 25 is an enlarged side view of the wire guiding mechanism, Fig. 26 is an enlarged front elevational view of the looping tongue supporting frame, Fig. 27 is a side view of the parts shown in Fig. 26, Fig. 28 is an enlarged front view of the lower end of the looping tongue structure and the anvil structure, Fig. 29 is an enlarged front elevational view partly in section of the carrier mechanism, Fig. 30 is a cross sectional view on plane 30—30, Fig. 29, Fig. 31 is a similar view taken on plane 31—31, Fig. 29, Fig. 32 is an enlarged front elevational view of the crowning dies and supporting frame, Fig. 33 is an enlarged view of the lower end of the crowning dies and the coöperating anvil structure for supporting the wire sections, Fig. 34 shows the form of hairpin turned out by the machine, Fig. 35 is a plan view, with parts shown in dotted lines, of the mechanism for carrying the hairpins through their bath, Fig. 36 is a side elevation of the same, Fig. 37 is an end view of the same, Fig. 38 is an end view taken from the opposite direction from Fig. 37, certain parts being omitted, Fig. 39 is a vertical section on the line 39—39 of Fig. 36, and Fig. 40 is a vertical section on line 40—40 of Fig. 36.

Referring to the embodiment of my invention shown in the drawings, 1 designates the bed frame of the machine, which is mounted on suitable legs 2, the superstructure 3 on the bed frame serving to support the various shafts and other driving and forming appliances. The machine is adapted to cut wire into sections, the sections being looped centrally, the loop then twisted, and the ends adjacent the loop bent downwardly to form the legs of the hairpin, the twisted loop sections and the upper ends of the legs being then crimped and humped.

Referring in detail to Fig. 1, it is to be noticed that the wire $w$ is fed to a wire straightener, which comprises a rectangular frame 4 from whose ends extend trunnions 5 and 6 bored centrally to receive the wire $w$ which is engaged by the teeth $t$ of the straightener. These trunnions 5 and 6 reciprocate on bearing brackets 7 and 8 on supporting frame 9 secured to the machine superstructure so that the entire straightening frame is longitudinally reciprocable. A pulley pinion 10 is splined to the trunnion 6 between the bracket and an auxiliary bracket 8', and by means of this pinion the wire straightener is rotated about the wire. As will be described in detail later, the arrangement of parts is such that the wire straightener is drawn toward the right by the wire (see Fig. 1) and is positively returned to its left position by cam mechanism shown in Fig. 1.

The wire is drawn through the straightener and intermittently fed toward the right end of the machine to the various forming devices. On the superstructure 3 below the path of the wire is a dovetailed guide-way 11 on which the gripper G reciprocates. (The construction of this gripper is clearly shown in Figs. 1, 11 and 12). The body 12 of the gripper has the dovetailed groove 13 in its under side for engaging the guideway 11, and the up-standing lugs 14 on the body 12 to carry a transverse pivot shaft 15 for pivoting at an intermediate point the lever 16. The guide end of this lever is bifurcated to provide bearing lugs 17 for the pivot pin 18 which is engaged by the vertical stud 19 of the gripper foot 20. The front end of the lever 16 deflects forwardly and carries a vertical screw 21 forming an adjustable abutment for coöperating with the cam stud 22 reciprocable in the enlargement 23 and carrying at its lower end the pivot fork 24 for the cam roller 25. The wire passes from the straightener trunnion shaft 6 through the gripper G between the foot 20 and the gripper body and is guided through the gripper by passing through the hole in the guide plate 26 secured to the gripper end.

When the cam roller 25 is raised, the wire is clamped by the foot 20 and carried with the gripper toward the right of the machine; and when the cam roller is allowed to drop, the foot 20 is released from the wire in order that the gripper may travel toward the left to get a fresh hold on the wire. For controlling the reciprocation of the gripper and the opening and closing thereof, a disk 27 is provided, this disk being mounted on the front end of the transversely extending shaft 28. This shaft has the radially extending slot 29 in which a crank pin 30 is radially adjustable, one end of the rod 31 being pivoted to this pin and having its other end adjustably connected to the lever 32 which is pivoted at its lower end to a bracket 33. At its upper end the lever 32 has a bearing slot 34 for the pin 35 extending forwardly from the gripper G, and with this arrangement, as the disk 27 rotates, the lever 32 will be swung laterally to effect reciprocation of the gripper G on its guide-way 11. The rod 31 having adjustable connection both with the crank pin 30 and the lever 32, and the lever 32 having adjustable pivot connection in the slot 33' of bracket 33, the travel of the gripper can be adjusted to a nicety.

To control the opening and closing of the gripper jaw, a cam lever 36 is provided which is pivoted at its left end on a pin 37 extending from the machine frame, its right end journaling a cam roller 38 which coöperates with the peripheral cam surface 39, on the disk 27. The lever 36 has the upper straight surface 36' which is engaged by the cam roller 25 on the gripper mechanism. The cam surface 39 is such that during substantially the entire travel of the gripper from left to right the surface 36' is in the upper horizontal position to hold the cam roller 25 raised and to keep the foot 20 securely clamped to the wire and thus the latter is drawn toward the right with the gripper, and then just before the gripper starts to return to the left the cam surface 39 allows the lever 36 to drop so that the cam 25 may likewise drop and release the gripper foot 20 from the wire.

The lever 32 is also used to control the reciprocation of the wire straightener. As before described, this straightener is free to reciprocate and is drawn toward the right with the wire. Restoration of the straightener toward the left is secured in the following manner: The rod 40 connects with the lever 32 and the head 41 on the frame 9 which supports the reciprocating straightener. This head 41 straddles the trunnion shaft 6 and has the base 42 slidable between guide-ways 43 on the frame 9. During swing of the lever 32 toward the right the wire which is frictionally engaged by the straightening teeth will draw the straightener to the right, and then when the gripper is released from the wire and the lever 32 swings toward the left the rod 40 slides the head 41 to the left, and the head engaging against the straightener will restore the straightener to its outer position (Fig. 20). In order to obtain accurate operation, the inner end of rod 40 has adjustable connection with the lever 32, the pivot pin 40' of the lever being adapted for longitudinal adjustment on lever 32 and is secured in adjusted position to the slotted bracket 44 fastened to the lever.

In order to hold the wire after it has been drawn inwardly by the gripper G, clamping mechanism C is provided, the particular construction of which is clearly shown in Fig. 15. In detail, the mechanism comprises a frame 45 secured transversely to the machine at the inner end of the gripper guide-way 11. The front end of the frame is enlarged to form the sleeve 46 having the opposite guide extensions 47 and 48 having a central bore 49 through which the wire passes. Inserted in the lower end of the sleeve 46 is the anvil member 50 whose head 50' extends into passageway 49 to form a seat for the wire. In the upper part of the sleeve 46 a plunger 51 is reciprocable and urged upwardly by a spring 52 engaging with the sleeve and the head 51' of the plunger. Extending upwardly on the body 45 and centrally thereof are the lugs 53 and 53' between which is pivoted on the pin 54 a walking beam or lever 55. The front end of this lever carries an adjustable abutment screw 56 for engaging the plunger 51 while the rear end of the lever carries an adjustable abutment screw 57 which coöperates at its lower end with the cam stud 58 which cam stud carries the fork 59 at its end which pivots the cam roller 60. When the cam roller is free the cam stud 58 will be released from the beam 55 and the spring 52 will swing this lever and will remove the lower end of the plunger 51 from the wire passing over the anvil head 50'. The cam roller 60 coöperates with the cam disk 61 and when the cam surface 61' reaches the roller it and the stud 58 will be raised to swing the lever 55 to depress the plunger 51 against the wire, thus securely clamping the latter. The position and extent of the cam surface 61' is such that the wire will be clamped and held during the outward movements of the gripper G but is released while the gripper is traveling inwardly.

As the wire is fed inwardly by the gripper mechanism and through the clamping mechanism it is first acted upon by the cutting mechanism S which severs it into the desired lengths, each of which lengths is subsequently bent and transformed into a hairpin. The details of construction of this cutting mechanism are clearly shown in Figs. 1, 13 and 14. The U-shaped frame 62 is mounted on the machine frame structure and secured thereto by means of screws 63. This frame has the outer and inner lower bearing halves 64 and 65 engaged by detachable upper bearing halves 64' and 65' respectively, the bearing structure 65, 65' being lined by a bushing 66. A shaft 67 is journaled in the bearings and has secured to its left end the driving pulley 68. The right end of the shaft has secured thereto a head 69 journaled in the bushing 66. The shaft has the central bore 72 through which passes the wire, and detachably inserted in the right end of the shaft is the guide bushing 73 bored to the gage of the wire used. Slidable radially over the front face of the head 69 are the blocks 74 and 74' from which extend studs 75 and 75' mounting respectively the hubs 76 and 76', the hubs being held in place by washers 77 and 77' respectively. The hub 76 has an enlarged disk section 78 provided with the cutting ridge or edge 79, while the other hub has the enlarged disk section 78' whose periphery is straight and over which the wire passes. Extending through passageways 70 and 70' in the head 69 and pivoted therein on pins 80 and 80' are levers 81 and 81' whose right ends have rounded heads for engaging in sockets 83 and 83' in the blocks 74 and 74'. The left ends of the levers extend beyond the bearing structure 65, 65' and carry respectively radially extending abutment screws 84 and 84'. Splined to the shaft 67 to be longitudinally reciprocable thereon is a cam hub 85 whose outer end is of reduced diameter to provide cam inclines 86 and 86' respectively. Secured to the left end of the hub is a grooved collar 87 which is spanned by the forked end 88 (Fig. 3) of a rock lever 89 which is pivoted by means of pin 90 to the frame 62 immediately behind the collar. Upon rotation of the pulley 68, the grooved collar, the cam hub and the levers 81, 81' and the cutting members 78 and 78' rotate bodily with the shaft 67, and while the wire is being fed toward the right by the gripper mechanism the lever 89 will be in position to hold the grooved collar and cam hub to the left to allow the springs 91 to draw the left ends of the levers 81 and 81′ toward each other and to spread the right ends of the levers and the blocks 74 and 74′. This results in the cutting edge 79 being moved away from the wire passing over the disk 78′, the wire being then free to move through the cutting structure. However, as soon as a length of wire has been shifted toward the right by the gripper mechanism and has been clamped by the clamping mechanism C, the lever 89 is rotated to shift the cam hub 85 toward the right. This results in moving the cam surface 86—86′ along the abutment screws 84—84′ to thus spread the outer ends of the levers and to cause the cutting edge 79 and disk 78′ to approach each other gradually whereupon the wire is severed. It will be noted that the cam surface 86′ acts slightly in advance of the surface 86 in order that the disk 78′ may be brought against the wire before the wire is engaged by the cutting edge 79. Immediately after such severing of the wire the lever 89 is again swung in the opposite direction and the cam hub withdrawn to allow separation of the cutting disks. The supporting blocks 74—74′ for the cutting members are dovetailed and are held in place by the dovetailed segmental plates 92 and 92′ fitting into the right end of the bushing 66 and secured to the head 69 by screws 93, perfect fit and alinement being assured by pins 94 extending from the head and receiving the plates.

In order to further hold the wire when it is being cut and to hold the wire at the right of the cut preparatory to further treatment thereof, auxiliary clamping mechanism D is provided adjacent the wire cutting members. The construction and operation of this clamping mechanism is clearly shown in Figs. 1, 3, and 16, and is in the form of an L-shaped frame 95 secured to the machine supporting structure, the vertical part having the sleeve 96 accommodating the plunger 97 which is urged downwardly by the compressed spring 98 within the sleeve and encircling the upwardly extending stem 99 of the plunger. The top surface 96′ of the sleeve is in the path of the wire and forms a guide therefor while the upper end of the stem 99 carries a plate 100 above the wire. Pivoted to the front of the machine supporting structure at the right of the clamping attachment 95 is a cam lever 101 whose left end journals the cam roller 102 which coöperates with the cam surface 103 on the disk 27 (Fig. 1). The upper surface of the lever 101 is engaged by the lower end of the plunger 97, and the arrangement and adjustment are such that while the wire is carried toward the right with the gripper mechanism the lever 101 will be raised by the cam disk 27 to hold the plate 100 above the wire to allow free passage of the wire, and after feed of the wire and during return of the gripper toward the left, the lever 101 will drop to allow the spring 98 to force the plunger 97 downwardly and to press the plate 100 against the wire whereby the wire is clamped, such clamping being simultaneous with the clamping of the wire by mechanism C already described.

Describing the driving arrangement for the mechanisms thus far referred to, a main drive shaft 104 is journaled in suitable bearings 105 and 106 (Fig. 2) and carries at its right end the driving pulley 107 connected by a belt 108 with any suitable driving shaft. The left end of this drive shaft carries a pinion 109 which meshes with a gear 110 on the upper cam shaft 111. At its right end this cam shaft carries a gear 112 which meshes with a gear 113 on the lower cam shaft 114, the shaft 111 being journaled in bearings 115—115 and the lower shaft 114 being journaled in bearings 116—116 (Fig. 2). At the top of the machine and journaled in bearings 117—117 is a shaft 118 having a pulley 119 by means of which it may be driven from any suitable source by belt 120, and suitable belt shifting mechanism 121 is provided to shift the belt to and from the loose pulley 122. This shaft has secured to its left end a belt pulley 123 connected by belt 124 with the straightener mechanism driving pulley pinion 10 already referred to. The shaft 118 carries also a pulley wheel 126 connected by belt 127 with the driving pinion 68 of the wire cutting mechanism, which cutting mechanism has already been described. The shaft 28 carrying the disk 27, already referred to, which controls the swinging of the grip mechanism lever, carries at its rear end bevel pinion 128 which meshes with the bevel gear 129 secured to the upper cam shaft 111. This shaft 111 also carries the cam disk 61 which as already described is engaged by the cam roller 60 for the clamping mechanism C. The fork lever 89 which controls the spreading and closing of the cutter mechanism described is pivoted at its rear end to a cross head 130 slidably mounted in a guide bracket 131 secured to the machine supporting framework. This cross-head 130 has a pin 132 extending rearwardly through the slot 133 of the bracket and this pin is engaged by the upper forked end of a lever 134 pivoted intermediate its end to the machine supporting structure as indicated at 135, the lower end of the lever carrying a cam roller 136 which operates in the groove of the cam 137 secured to the upper cam shaft 111.

Describing now the mechanism for forming loops in the blanks, a transversely extending guide frame 138 is provided on the machine structure to the right of the cutting mechanism, this guide frame forming a transverse guide-way 139. In this groove a plate 140 is reciprocable, a pivoted block 141 serving to receive the forked end of the cam lever 142 pivoted intermediate its ends on a pin 143 supported at the back end of the guide frame 138 (Fig. 5). The lower end of this lever carries a cam roller 144 engaging in the cam groove of the cam disk 145, the latter being mounted on the cam shaft 111. The plate 140 has recesses 146 and 146′ cut in its front end for the purpose of receiving the rear ends of cam fingers 147 and 147′, these fingers being secured to the plate in any suitable manner as by screws 148 (Figs. 21 and 22). In the front end of the guide-way 139 is a plate 149 which engages below the cam fingers 147, 147′ and which at its rear end carries the upstanding lug 150 which engages between the cam fingers. In the opposed ends of the plate 140 and the lug 150 are pockets 151 and 152 respectively for receiving the helical spring 153, this spring tending to separate the two plates, the distance of separation being limited by stop extensions 154 and 154′ on the respective cam fingers. Extending upwardly from the plate 149 adjacent its rear end are pivot pins 155 and 155′ on which are pivoted at their rear ends the anvil members 156 and 156′, these anvil members having opposed pockets for receiving a helical spring 157 which tends to spread the members apart. At their side edges near the front end thereof these anvil members carry small cam blocks 158, 158′ while the ends of the cam fingers 147 and 147′ are cut away at their inner faces to form recesses 159 and 159′ for receiving the cam blocks when the plates 140 and 149 are separated. The rear ends of the cam blocks and recesses are beveled as shown so that when the two plates 140 and 149 are brought together the anvil members will be swung toward each other against the force of the spring 157.

Disposed in guideway 139 to the right of the plates 140 and 149 is a bar 160 which carries a plate 161 overlying the plates 140 and 149. The rear end of the plate 140 is cut away as indicated to leave room for a block 162 pivoted to the rear end of the bar 160, this block receiving the forked upper ends of cam lever 163 pivoted on pin 143 and carrying at its lower end a cam roller 164 for coöperating in the groove of the cam 166 mounted on shaft 111 (Figs. 2 and 5). Extending transversely over the front ends of the cam fingers 147 and 147′ and in front of the plate 161 is an ejector plate 167 which is secured to the right-hand cam finger 147 as by screws 168. Running along adjacent the front edge of the ejector plate is a guide groove 169 which, as will be later described, is normally in line with the wire coming from the cutting mechanism, the left entrance opening to the groove being well beveled. At the right end of the plate a stop piece 170 for the wire is secured and adjacent this stop piece a spring 171 is secured to the front edge of the ejector plate, its free rounded end 171′ engaging in a notch 172 cut into the plate up to the guide channel therethrough, this spring acting against the wire to hold it in place against the stop piece after the wire has been cut by the cutting mechanism.

Mounted over the front end of the block 138 is a bracket 173 having the vertical guide-way 174 for receiving the frame 175 which has at its upper end a pocket 176 for receiving the rounded end of the arm 177 secured to the pin 177′ journaled in the bracket 173 (Fig. 5), the pin having also the arm 178 secured thereto from which extends the connecting rod 179 terminating in the guide frame 180 which spans the shafts 111 and 114, the guide frame also forming a support for a roller 181 engaging in the groove of the cam 182 on shaft 111 (Fig. 9).

The frame 175 has at its lower end the vertical compartment 183 in which a block 184 is vertically slidable, this block having a side pocket 185 for receiving the end of the arm 186 secured by pin 187 on bracket 173, the right end of the pin having secured thereto the arm 188 from which a connecting rod extends to a guide frame 189 spanning the shafts 111 and 114, this frame pivoting a cam roller 190 engaging in the groove of the cam 191 mounted on shaft 111 (Figs. 2 and 9).

The block 184 carries the loop-forming tongue 192 secured thereto by strap 193, the tongue passing through the slot 194 provided in the bottom of the frame 175 and passing also through a slot provided in the die block 195 secured to the lower end of the frame 175. Detachably secured to the front of bracket 173 is a front plate 196 having on its inside a vertical slot 197 for receiving and guiding the loop-forming tongue. Secured to the front of the bracket 173 below the guide-way 174 is a top plate 199 (Figs. 23 and 5) which overhangs the wire ejector plate 167, this top plate having a notch 199 cut in its front edge, and the ejector plate 167 having a notch 200 cut into its front edge, these notches being below the path of the looping tongue 192.

After the cutting operations the wire blanks are fed against stop piece 170 by upper and lower rollers 201 and 202 into the proper position for the loop-forming operation. The lower roller 202 is secured to the front end of the shaft 203 journaled in the frame 173 and carries at its rear end the gear 204 and also a belt pulley 205 (Fig. 9). The upper roller 201 is secured to the front end of shaft 206 journaled in bearings 207 and 208 on frame 173, this shaft carrying at its rear end the gear 209 meshing with the gear 204. A pulley 210 on shaft 118 is connected by a belt 211 with the pulley 205, the rollers being driven to carry the wire from the cutting mechanism into the field of the looping mechanism. The rollers are adjusted vertically to be apart a distance slightly less than the diameter of the wire to be propelled, and a spring 208' acting on bearing 208 tends to press the upper roller against the wire, the wire being propelled by friction. The top plate 198 is grooved out and slotted as indicated at 198' to allow engagement of the top roller with the wire which passes below the top plate, the ejector plate having the upper and lower notches $x$ and $x'$ for accommodating the upper and lower rollers and the plate being perforated at $y$ at these notches and in register with the wire guide channel 169 in order that the rollers may engage the respective sides of the wire.

Before the wire lengths reach the looping field the bar 160 which carries the ejector plate is in its rearmost position, the wire guiding grooves in the ejector plate being in line with the wire coming from the cutting mechanism (Fig. 7). After the cutting operation the wire blank is propelled by the rollers 201 and 202 until the wire length strikes the stop piece 170 on the ejector plate, the wire length then lying in the groove of the ejector plate and being yieldingly held therein by the spring 171. The frame 140 carrying the cam fingers 147 and 147' and the plate 149 now moves forwardly a distance until the plate 149 strikes an abutment piece 212 secured to the front end of the frame 138. The bar 160 which carries at its front end the ejector plate is now shifted forwardly until the wire guide channel is brought forwardly beyond the front edge of the top plate 198 whereupon the wire is in the vertical plane of operation of the looping tongue and the front ends of the anvil members. The block 184 carrying the looping tongue is now shifted downwardly by its cam mechanism, the lower edge of the tongue engaging the wire length at its middle point and drawing the central part of the length downwardly between the front ends of the anvil members to form a loop (Fig. 28), the ends $e$ of the length adjacent the loop being swung upwardly against the upwardly inclined wings $a$ and $b$ at the lower end of the top plate 196, the lower end of the tongue being grooved on its sides and bottom to more accurately engage with the wire as indicated at $c$ and $d$ (Fig. 27). After the loop is thus formed the frame 175 is shifted downwardly by its cam mechanism and engages the upwardly deflected ends $e$ of the length and brings these lengths into horizontal position against the tops of the anvil members at the ends thereof, the die block 195 having a groove 213 cut in its front lower edge for receiving the wire and holding it in true horizontal position against the inner face of front plate 196 and the front ends of the anvil members 156 and 156'. When the looping tongue reaches its lowermost position and the loop has been formed the bar 160 is returned to carry the ejector plate back to its rear position and this plate is fully withdrawn before the wire is clamped by the die block 195. After withdrawal of the ejector plate and clamping of the wire the loop tongue is raised entirely out of the loop and shortly thereafter the plate 140 is shifted forwardly to carry the cam fingers 147 and 147' over the plate 149 to cause coöperation of the beveled cam surfaces at the front ends of the fingers and anvil members, the result being that the anvil members are swung together to compress the loop, that is, to bring together the two sections of wire adjacent the loop. The plate with the cam fingers moves forwardly over the plate 149 against the force of the spring 153 hereinbefore referred to.

Substantially simultaneously with the raising of the looping tongue, loop-twisting mechanism is raised into place to receive and to twist the loop, and at practically the same time carrier mechanism is started in operation toward receiving the length after looping and twisting. After the twisting operation the carrier mechanism will be in place to receive the twisted blank and after the blank has been received by the carrier mechanism the plate 140 together with the cam fingers will have been shifted rearwardly relative to the plate 149 to cause disengagement of the cam surfaces on the fingers and anvil members respectively to allow re-opening of the anvil members. After such spreading of the anvil members the plate 149 will be returned with the plate 140 to the initial rear position.

It will be noted that pins 214 extend from the lower ends of the die block 195 behind the groove 213. These pins are behind the wire after the looping operation and if for any reason the wire should have been broken during the looping operation, the wire pieces will be ejected from the machine when the anvil members are withdrawn. In order to receive these pins the front ends of the anvil members have vertical grooves 215 and 215'.

Describing now the twisting mechanism, upper and lower brackets 216 and 217 support a spindle 218 for rotational movement and vertical reciprocation, this spindle having substantially midway its ends a pinion section 219 meshing with a gear 220 which is driven in a manner to be described later. The lower end of this spindle carries a collar 221 for receiving the forked extension 222 on a plate 223 slidable in a vertical frame 224 secured to the supporting framework of the machine. A lug 223' extending from the lower end of this plate is connected by link 225 with the front end of a cam lever 226 pivoted on a pin 227 supported in the bracket 228 extending from the guide frame 224. The inner end of the lever has a cam roller 229 which engages in the groove of the cam 230 on the lower cam shaft 114.

The spindle 219 is hollow and terminates in a head 231 over whose ends is fitted the cap 232. Secured to the top of the cap are two segmental plates 233 and 234 whose inner faces are beveled in order to form a diametrically extending dovetailed guideway 235. Slidable radially in opposite ends of this dovetailed guideway are two blocks 236 and 237 to whose inner ends are secured the interfitting L-shaped jaw heads 238 and 239 which at their center leave the vertical rectangular space *s* for receiving the wire loop already referred to, these jaw heads being normally apart until the spindle has been raised and the loop received, whereupon the blocks 236 and 237 are brought to cause the heads to clamp the loop just prior to rotation of the spindle to twist the loop. The radial movement of the jaw blocks and heads is controlled by levers 240 and 241 pivoted on pins 242 and 243 extending through the cap 232, the rounded upper ends of the levers engaging in pockets 244 and 245 formed respectively in the jaw blocks 236 and 237. The lower ends of the levers extend into radial spaces 246 and 247 in the sleeve part 231 and carry adjustable abutment screws 248 and 249. The inner ends of these abutment screws are in the path of the rod 250 extending upwardly through the spindle, the upper end of this rod having a tapered cam shoulder 251 leading to the reduced end 252. When the rod 250 is in its upper position the end 252 will be between the inner ends of the abutment screws 248 and 249 in order that the jaw blocks and heads may be forced apart by the springs 253 between the jaw heads. When, however, the rod is moved upwardly the lower ends of the levers 240 and 241 are swung apart by the engagement of the cam surface 251 with the abutment screws and the upper part 250' of the rod comes between the abutment screws so that the clamping blocks and heads are brought together to securely clamp and hold the loop during the twisting operation. The lower end of the rod has a grooved collar 254 engaged by the forked extension 255 on the plate 256 which reciprocates vertically in the frame 224 over the plate 223. The lower end of plate 256 has the extension 257 connected by link 258 with the front end of cam lever 259 pivoted on the pin 227, the inner end of this lever carrying a cam roller 260 which engages in the groove of cam 261 mounted on the lower cam shaft 114.

When the looping tongue is being raised the cam 230 first operates to shift the spindle 218 upwardly to carry the spindle jaws toward the loop to receive the loop in the space *s* between the jaw heads 238 and 239. After the loop is thus received the rod 250 which is normally down is raised by the operation of the cam mechanism 261 and the levers 240 and 241 are actuated by the upper end of the rod to cause the jaw blocks and heads to come together to securely clamp the loop. After such clamping of the loop the gear 220 is driven to rotate the spindle in a positive direction thereby causing twisting of the loop, and after such twisting operation the cam 261 becomes effective first to cause lowering of the rod 250 thereby to allow opening of the jaw blocks and heads to release the loop, whereupon cam 230 also becomes operative and the entire twisting mechanism is restored to its lower position.

In order to discharge any pieces of wire that might remain in the twisting jaws after a twisting operation, due to break of the wire, I provide an ejector tongue 262 for passing through the loop receiving space. This ejector tongue extends from the end of a yoke 263 mounted on the upper ends of vertical rods 264 and 265 extending through the head 231 of the spindle, and when the spindle is dropped these rods engage with the upper spindle journaling bracket 216 so that upon further downward movement of the spindle the tongue 262 will enter the loop space *s* to eject any pieces or particles of wire that might remain in the space after the looping operation. In order to prevent any particles or dirt from entering between the jaw heads 238 and 239 a guard plate 266 is secured to one of the jaw heads to extend over both jaw heads and the space therebetween.

The mechanism for controlling rotation of the spindle rotating gear 220 is clearly shown in Figs. 1, 3, 7 and 8. Extending forwardly from the machine supporting framework is a guide bracket 267 in which a rack 268 is reciprocable, the shaft 269 which supports the spindle driving gear 220 carrying a pinion 270 to be engaged by the rack. The rear end of the rack terminates in a guide frame 271 slidable on the block 272 on the upper cam shaft 111. A link 273 pivoted to the frame 271 has adjustable pin and slot connection with the cam lever 274 which lever is pivoted at its lower end to the machine supporting frame and carries a cam roller 275 coöperating with the groove in cam 276 on the lower cam shaft 114 (Fig.

7). The adjustment of the cam mechanism is such that at the proper time the spindle will be rotated to twist the loops in the wire lengths.

After the looping and twisting operation the carrier mechanism conveys the twisted blanks to the crowning mechanism. The carrier mechanism is illustrated in Figs. 1, 2, 3, 4, 29, 30 and 31. The carrier T is slidable longitudinally on the guide rail 277 secured to the front of the machine structure to the right of the looping and twisting mechanism. A rod 278 extends toward the left from the carrier and has yielding spring connection at its other end with the block 279 shiftable on the guide bar 280 (Fig. 1). A cam lever 281 pivoted at its rear end to the machine supporting structure (Fig. 3) is engaged at its forked front end with the block 279 and at an intermediate point carries a cam lever 282 engaging in the cam groove 283 of the cylindrical cam 284 mounted on the upper cam shaft 111, this cam adjustment being such that the carrier is shifted longitudinally at the proper time to coöperate with the looping and twisting mechanism and with the crowning mechanism.

The carrier has a stationary jaw member 285 and the pivoted jaw member 286 between which and the carrier body is interposed a spring 287 tending to hold the upper ends of the jaws together. Extending forwardly from the lower end of the carrier body is a bracket 288 to which is pivoted a spring-resisted detent latch 289 having the abutment 290 for receiving the lower end of the pivoted jaw member 286 to hold this jaw member in open position. The rock shaft 291 extending parallel with the direction of travel of the carrier has a trip dog 292 secured thereto for engaging at the proper time with the latch 289 to effect release of the pivoted jaw member to thus allow closure of the jaws. The trip dog 292 is mounted on the shaft 291 adjacent the looping mechanism, and at its outer end the shaft carries a forked arm 293 engaged by pin 294 on the cam slide bar 295, this cam bar being shiftable in a frame 296 on the machine supporting structure and carrying a cam roller 297 for coöperating with the cam 298 on the cam shaft 111, a spring 299 tending to hold the roller in engagement with the cam. The outer end of shaft 291 also carries the dog 300, adapted upon rotation of the shaft 291 to engage with the trip finger 301 when the carrier T is at the outer end of its guideway 277, this trip finger having connection by shaft 302 with the pivoted jaw member. Fig. 31 shows the dog and finger in engagement, the pivoted jaw being swung to open position in order that the latch 289 may swing upwardly to carry its abutment 290 in front of the lower end of the pivoted jaw member as shown in Fig. 30. While the twisting operation is taking place the cam 284 becomes effective to shift the carrier to within a short distance of the looping mechanism (full lines, Fig. 29), the carrier then remaining stationary until the conclusion of the twisting operation, and then while the twisting spindle is retreating the carrier is advanced until its open jaws receive the lower end of the twisted loop on the length held below the looping mechanism, as illustrated in dotted lines at the left of Fig. 29. When the carrier is in this position its detent latch 289 will be in register with the dog 292 on the shaft 291 and this shaft is then rotated by the operation of cam 298 so that the latch 289 is rotated by the dog to release the open jaw member and to allow closure of the jaws to clamp the twisted loop wire length, this length being released from its holding mechanism when thus received by the carrier. The cam 284 then becomes effective to shift the carrier to its outer end (dotted lines Fig. 29), to convey the wire length supported thereby into the field of operation of the crowning mechanism, and after delivery of the wire length to the crowning mechanism the cam 298 again becomes effective to rock the shaft 291 to cause the dog 300 to engage with the trip finger 301 to effect opening of the jaws and release of the wire blank, the pivoted jaw member being then again held in open position by the latch arm 289, the carrier being then ready to be again shifted toward the looping mechanism to receive another looped length.

The crowning mechanism K is clearly illustrated in Figs. 1, 3, 4, 6, 32 and 33. The vertical guide frame 303 accommodates a plunger 304 which has the pocket 305 for receiving the front end of arm 306 extending from shaft 307, this shaft having also the arm 308 connected by rod 309 with a guide frame 310 straddling the shafts 111 and 114, the guide frame having a cam roller 311 engaging with the cam 312 on shaft 111. The plunger 304 has two downwardly extending arms 313 and 314 pivoted to its front face and carries between these arms the tongue 315, a spring 316 tending to hold the tongue down. The arms 313 and 314 carry at their lower ends the crowning dies 318 and 319 having their inner lower edges cut away to leave semi-circular crowning pockets 320 and 321, the tongue 315 terminating at the lower ends of these pockets as clearly shown in Fig. 32. The bracket 322 on the machine supporting structure forms a transverse guide-way 323 at its top for a block 324, this block being engaged by the upper end of cam lever structure 325 whose lower end carries the cam roller 326 coöperating with cam 327 on the lower cam shaft 114. Reciprocable on top of the block 324 is the anvil 328 whose stem 329 extends through the lug 330 at the front end of the block 324, a spring 331 encircling the stem between the anvil and lug, and the abutment nuts 332 at the outer end of the stem limiting the inward movement of the anvil by the spring with reference to the block 324. At the rear of the vertical line of the crowning plunger is the guide frame 333 carrying the block 334 which is reciprocated in said frame by the cam lever mechanism 335 having the cam roller 336 engaging in cam 337 on cam shaft 338. Stationarily mounted on the frame 333 is the stop block 338 for the anvil 328. Normally the cam mechanisms 327 and 337 are in such position that the blocks 324 and 334 are separated and the anvil 328 held away from stop block 338 in order that the carrier T may bring a looped and twisted wire length into position in front of the stop 338 ready for the crowning operation. As soon as the carrier comes to this position the cam 327 operates to shift the block 324 inwardly until the anvil 328 yieldingly abuts against the stop block 338, the front of the anvil, as shown in Fig. 33, being bifurcated in order to receive between its legs the twisted loop.

After the crowning and deflecting operation, the hairpin legs are crimped and the tongue humped to give the pin the final shape shown in Fig. 34. The crimping and crowning dies 339 and 340 are carried respectively at the inner ends of the blocks 324 and 334, and after the crowning operation the cams 327 and 337 operate to bring the dies together to form the crimps and hump. Further operation of the cams results in the return of the blocks to their outmost position, whereupon the anvil 328 is eventually withdrawn from the bends.

The pins are now in their final shape, but inasmuch as it is advisable that the pins receive a protective coating, they are not discharged directly into the receptacle upon the withdrawal of the anvil from the bends. As shown in detail in Fig. 29, the carrier T is provided with a forward pair of jaws 350 and 351, which are operated simultaneously with the rear jaws 285 and 286. The relative proportioning of the parts is such that when the carrier T is at the extreme left it is in position for the jaws 285 and 286 to receive a looped and twisted wire link while the forward jaws 350 and 351 are in position to grip a finally shaped pin just prior to the discharge of the latter from the anvil 328. Then upon the movement of the carrier T to the right the looped and twisted wire link or half-finished pin is carried by the rear jaws 285 and 286 in front of the stop 338 ready for the crowning operation. Simultaneously, by means of the forward jaws 350 and 351, the carrier T transfers a finally shaped pin to the position shown in dotted lines at the right on Fig. 29, this transfer being for the purpose of properly positioning the finally shaped pin so that it may be directly discharged on to the carrier 352 which conducts it through the japanning and drying operations, the particular mechanism for discharging it being hereinafter described in detail.

As shown in Figs. 1 and 2, the chain 352 is driven in timed relation to the feeding mechanism and in such ratio of speed that each successive hook 353 carried by the chain 352 registers with the forward jaws each time a finally shaped pin is fed forward to the extreme right-hand position of the carrier T.

While it is obvious that the connection for driving the chain in such timed relation could be made with any moving part of the forming mechanism, the particular drive train shown is from the cam shaft 114, chain 354, worm shaft 355, worm gears 356 and 357, to the vertical shaft 358 upon which is mounted the drive sprocket 359. A plurality of supplementary drives are also obtained from a continuation of the shaft 355 which is connected with like worm wheels with vertical shafts 360 and 361, and a plurality of intermediate gear shafts 374 and 375. These last-mentioned series of shafts are provided with spur gears 362 around which the chain 352 passes as it weaves its way back and forth through the drying oven 363.

The pin when discharged upon the hooks 353 is first carried through a japanning tank before passing to the drying oven. As shown in Fig. 35 this tank 364 is mounted on the base 365 of the oven frame and is positioned at one side of the oven and directly in the path of the chain as it comes from the sprocket wheel 359. Therefore, the pins coming from the forming mechanism are carried first into the japanning tank and from there into the oven in the manner indicated in the plan view shown in Fig. 35. A plurality of bearings 366, 367 and 368 control the immersion of the pins into the fluid, these bearings being preferably adjustable by means of set screws 366', 367' and 368'. The adjustable feature of these bearings is further employed for the following purpose: The head or crown of the pin is sometimes found to require a heavier coating of japanning than the remainder of the pin, and in order to avoid the necessity of giving the entire pin a second coating the center bearing 367 is adjusted to a higher level than the bearings 366 and 368. This permits of the pin being completely immersed in the japanning fluid as it passes under the bearings 366 and 368, but as it passes the center bearing 367 its upper end is raised out of the fluid and subsequently re-immersed as it passes under the bearing 368. Thus the main body of the pin receives but one dipping into the fluid, while the crown portion of the pin is first immersed, then withdrawn out of the fluid and subsequently re-immersed to receive a second coating. In Figs. 39 and 40, the relative position of the pin as it passes the bearings 366 and 367 is clearly shown.

After passing through the tank 364 the pins are carried into the oven 363, the latter being heated to the desired temperature by means of burners 370 positioned below the deflector plates 371 and connected in the usual manner with the fuel supply pipe 372, the individual burners being controlled by separate shut-off valves. While the particular form of the oven may be changed to meet the peculiar requirements of the article treated, I preferably form it to such width that the carrier can be forced to travel the entire length of the oven several times. This permits of the pins or other articles being treated, remaining in the oven for a considerable length of time without stopping the carrier. Thus in the particular construction shown in Fig. 35, each pin is treated in the oven the length of time necessary to pass its link the full length of the oven 10 times. As shown in Figs 35, 36, 37 and 38, the oven is carried by a frame comprising the base 365, end uprights 381 and 382 bolted to the base 365 and secured at their upper ends by tie frame bars 383. The parts are therefore all of comparatively simple construction and can be readily replaced or substituted.

A material advantage is derived from this construction in that a continuous chain is employed as shown in Fig. 35, the pins being fed continuously on to the carrier at a point near the upper end of the shaft 358, steadily advanced through the japanning tank 364 and drying oven 363 to the stripper plate 380, which serves to lift the pins from the carrier as it comes from the oven and discharging them into a suitable receptacle. The link from which the pin has been removed by the stripper plate 380 continues back on the sprocket wheel 359 on the shaft 358 and there receives another pin, and the cycle of operation is repeated.

The continuous feed of the carrier chain as above described through the japanning and drying processes, is an important feature of my invention, and it is obvious that while I have shown and described the pins as automatically fed to the hooks 353 that they could be placed upon such hooks by hand labor without departing from the scope of my invention.

However, in the preferred construction the pins as formed are automatically placed upon the hooks 353 when discharged from the forming mechanism. In the particular embodiment of the invention shown in the drawings, the detailed mechanism for discharging the pins as formed, on to the hooks 353, is as follows for each cycle of operation:

In the position shown in Figs. 29 and 30, the carrier T is just returning to the left and the rear jaws 285 and 286 are held in open position by the detent latch 289 in the manner hereinbefore fully set out. At the same time the forward jaws 350 and 351 are held open in the following manner:

The movable forward jaw 350 is pivoted at 390 to the bearing post 391 of the carrier T, and is normally pressed toward closed position by a spring 392. When, however, it has been opened by the action of the dog 300 against the trip finger 301, which acting through the shaft 302 rocks both the forward and rear movable jaws into open position, it is locked in open position by means of a detent latch 392 which engages the lower end of the movable jaw 350. This detent latch 393 is secured to the shaft 394 on which the detent latch 289 is fastened. It is obvious, therefore, that when the trip lever 292 releases the detent 289, it will simultaneously release the detent 393, and both the forward and rear jaws will close at the same time. The action of the lever 292 to release the latching detents takes place when the carrier T is at the extreme left position, the rear jaws gripping a half finished pin and the forward jaws gripping a finished pin just prior to the release of the latter from the anvil 328. The forward jaws grip the finished pin near its center as illustrated in Fig. 29. The carrier now starts its forward movement (that is, movement to the right) to transfer the half finished pin to the anvil and the finished pin to a point where it will be released so as to fall on to one of the hooks 353 on the carrier chain 352.

In order to insure that the pin will drop correctly onto the hooks, the following guiding mechanism is preferably employed as shown in Fig. 29: Both above and below the plane of the forward carrier jaws, is arranged a deflecting plate, the lower deflecting plate 396 being of resilient material. The upper deflecting plate 397, however, is formed as a door hinged at 398 to a guard box 399, adapted to surround the upper end of the completed pin. This door is normally held in closed position by a spring 400. Acting in the opposite direction from the spring 400 is a pair of light springs 401 and 402, positioned above and below the plane of the forward jaws and adapted upon the initial movement of the carrier to the left to force the pin away from the recessed portion of the stationary jaw, this preventing the accidental return of the pin with the carrier jaws. Positioned below the deflecting plate 396 is a guard 403 spaced from the guard 404, and between these guards the lower ends of the pin are held as it drops upon the carrier hooks. As previously stated, the movement of the carrier chain 352 is so timed in relation to the opening and closing of the jaws 350 and 351, that upon each operation of the latter to release a pin a carrier hook will be advanced to receive the pin as it drops through the lower deflecting plate 396.

While I have shown and described in detail a particular construction and arrangement of parts for automatically transferring the pin from the forming mechanism to the carrier device, it is obvious that various changes in the construction and arrangement of these parts and other elements of the machine, can be made without departing from the scope of my invention, and I do not desire to limit the invention except as specified in the appended claims.

I claim as my invention:

1. In an apparatus of the character described, the combination with means for forming wire into a plurality of hairpins, of means for applying a protective coating to said hairpins, and means for delivering the hairpins from the forming machinery to the coating machinery.

2. The combination with means for forming a plurality of articles from a continuously advancing wire, of a receptacle for holding the coating substance, and means for carrying said articles through said receptacle, said means extending to a position adjacent the discharge from the forming mechanism.

3. The combination with means for forming a plurality of articles from a continuously advancing wire, of a receptacle for holding a coating substance, and means for carrying said articles through said receptacle at a rate proportioned to the rate of discharge of the articles from the forming mechanism.

4. The combination with means for forming a plurality of articles from a continuously advancing wire, of a receptacle for holding a coating substance, a carrier for conducting said articles from the forming mechanism through said receptacle, and means for advancing said carrier at a rate proportioned to the rate of discharge of the articles from the forming mechanism.

5. The combination with means for forming a plurality of articles from a continuously advancing wire, of a receptacle for holding a coating substance, an endless carrier adapted in one position of advancement to be positioned beneath the discharge from the forming mechanism, said carrier in a subsequent position of advancement being adapted to conduct the formed articles through the coating receptacle, and means for driving said carrier at a rate sufficient to receive the articles directly from the forming mechanism.

6. The combination with means for continuously forming a plurality of articles, of a receptacle for a coating fluid, a drying chamber, an endless carrier for successively conducting the formed articles through said coating receptacle and drying chamber, said carrier having a plurality of hooks, and said forming mechanism having discharge mechanism for releasing the formed articles to automatically fall upon said hooks, and means for holding said articles from vibration while engaging said hooks.

7. The combination with means for continuously forming a plurality of articles having a loop portion, of an endless carrier device having a plurality of hooks, a receptacle for a coating fluid, a drying chamber, and means for advancing said carrier to successively position said hooks to automatically receive the formed articles and to successively conduct the same through said coating receptacle and drying chamber.

8. The combination with means for continuously forming a plurality of articles having a loop portion, of a receptacle for a coating fluid, a carrier for automatically conducting the articles from the forming mechanism through the coating fluid, and means for adjusting said carrier device as it passes through the fluid receptacle to produce a multiple coating on the loop portion of the article.

9. The combination with means for continuously forming a plurality of articles, a receptacle for a coating fluid, a drying chamber, and a continuously advancing endless carrier adapted to convey said articles from the forming mechanism through said coating receptacle and said drying chamber, said carrier being mounted to weave back and forth through the drying chamber to receive a proper drying while maintaining movement of the carrier at a rate equal to the rate of discharge of the articles from the forming mechanism.

10. The combination with means for automatically forming a plurality of articles having a loop portion, of a carrying device having a plurality of hook portions, and means for advancing said carrier device so that each successive hook portion is positioned to engage the loop of a formed article as the latter is discharged from the forming mechanism.

11. The combination with means for continuously forming a plurality of articles having a loop portion, of a receptacle for holding a coating substance, an endless carrying device having a plurality of hook portions, and means for advancing said carrying device so that each successive hook portion is positioned to engage the loop of a formed article as the latter is discharged from the forming mechanism, said carrying device in another position of advancement being adapted to immerse the article in the coating substance contained in said receptacle.

12. The combination with means for continuously forming a plurality of articles having a loop portion, of a receptacle for holding a coating substance, a drying chamber, an endless carrying device mounted to successively pass through said coating substance and said drying chamber, and means for advancing said carrying device to successively receive said articles when discharged from the forming mechanism and maintaining them in the drying chamber for an extended period while in engagement with said carrier device.

13. The combination with means for forming a plurality of wire articles, of means for applying a coating to said articles, and means for automatically conducting the articles from the forming mechanism and conducting them through the coating means.

WALTER H. HERMSDORF.

Witnesses:
F. L. BELKNAP,
JOYCE M. LUTZ.